United States Patent
Masas et al.

(10) Patent No.: US 10,493,609 B2
(45) Date of Patent: Dec. 3, 2019

(54) APPARATUS FOR INSTALLING FASTENERS AND EXPLOSIVE LOADS FOR USE THEREWITH

(71) Applicants: Fernando Masas, Houston, TX (US); Joe Lin, Missouri City, TX (US)

(72) Inventors: Fernando Masas, Houston, TX (US); Joe Lin, Missouri City, TX (US)

( * ) Notice: Subject to any disclaimer, the term of this patent is extended or adjusted under 35 U.S.C. 154(b) by 443 days.

(21) Appl. No.: 15/352,373

(22) Filed: Nov. 15, 2016

(65) Prior Publication Data
US 2017/0057070 A1    Mar. 2, 2017

Related U.S. Application Data

(63) Continuation of application No. 13/567,230, filed on Aug. 6, 2012, now abandoned, which is a continuation-in-part of application No. 12/785,674, filed on May 24, 2010, now abandoned, which is a continuation-in-part of application No. 12/704,706, filed on Feb. 12, 2010, now Pat. No. 8,397,969.

(51) Int. Cl.
| B25C 1/12 | (2006.01) |
| B25C 1/16 | (2006.01) |
| B25C 1/18 | (2006.01) |
| F16B 19/14 | (2006.01) |
| B25C 1/10 | (2006.01) |

(52) U.S. Cl.
CPC ............... *B25C 1/123* (2013.01); *B25C 1/10* (2013.01); *B25C 1/163* (2013.01); *B25C 1/188* (2013.01); *F16B 19/14* (2013.01)

(58) Field of Classification Search
CPC .. B25C 1/10; B25C 1/12; B25C 1/123; B25C 1/126; B25C 1/085–087; B25C 1/16; B25C 1/163; B25C 1/166; F42B 3/006; F16B 19/14
USPC ................. 411/20, 440, 441, 923; 227/9, 10
See application file for complete search history.

(56) References Cited

U.S. PATENT DOCUMENTS

| 2,665,421 A | * | 1/1954 | Temple | B25C 1/12 227/9 |
| 2,765,464 A | * | 10/1956 | Weichold | B25C 1/143 227/10 |
| 2,775,762 A | * | 1/1957 | Hilti | B25C 1/12 227/11 |
| 2,968,811 A | * | 1/1961 | Henning | B25C 1/123 227/8 |
| 3,248,032 A | * | 4/1966 | Bochman, Jr. | B25C 1/123 227/11 |

(Continued)

*Primary Examiner* — Stephen F. Gerrity
*Assistant Examiner* — Joshua G Kotis
(74) *Attorney, Agent, or Firm* — John R. Casperson

(57) ABSTRACT

An improved tool for installing an explosively driven fastener as well as an improved explosively driven fastener for use therewith are disclosed. The fastener includes a nail having a head with an explosive load attached thereto in a plastic cap that includes a buffer. The tool has a plurality of concentric cylinders and springs including a muzzle for receiving the fastener head and explosive load. A spring actuated firing pin ignites the load causing it to explode and drive the nail out of the tool. The explosion also automatically resets the tool. The tool and the fastener provide many advantages over existing explosively driven fasteners and the tools used to install them.

16 Claims, 15 Drawing Sheets

(56) References Cited

U.S. PATENT DOCUMENTS

| | | | | |
|---|---|---|---|---|
| 3,473,718 | A * | 10/1969 | Wackrow | B25C 1/146 227/10 |
| 3,559,272 | A * | 2/1971 | Hsu | B25C 1/087 227/10 |
| 5,423,469 | A * | 6/1995 | Armstrong | B25C 1/082 227/9 |
| 5,904,284 | A * | 5/1999 | Lin | B25C 1/126 227/11 |
| 6,059,163 | A * | 5/2000 | Pfister | B25C 1/14 173/211 |
| 7,097,085 | B2 * | 8/2006 | Arnold | B25C 1/10 227/10 |
| 7,896,210 | B2 * | 3/2011 | Popovich | B25C 1/14 227/10 |
| 2002/0113111 | A1 * | 8/2002 | Schalbetter | B25C 1/105 227/10 |
| 2007/0210132 | A1 * | 9/2007 | Akiba | B25C 1/08 227/10 |
| 2008/0302846 | A1 * | 12/2008 | Thompson | B25C 1/10 227/10 |

* cited by examiner

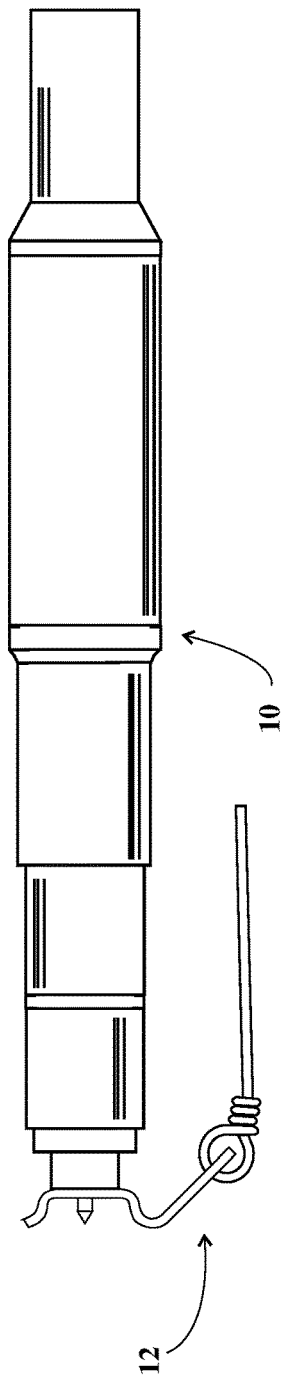
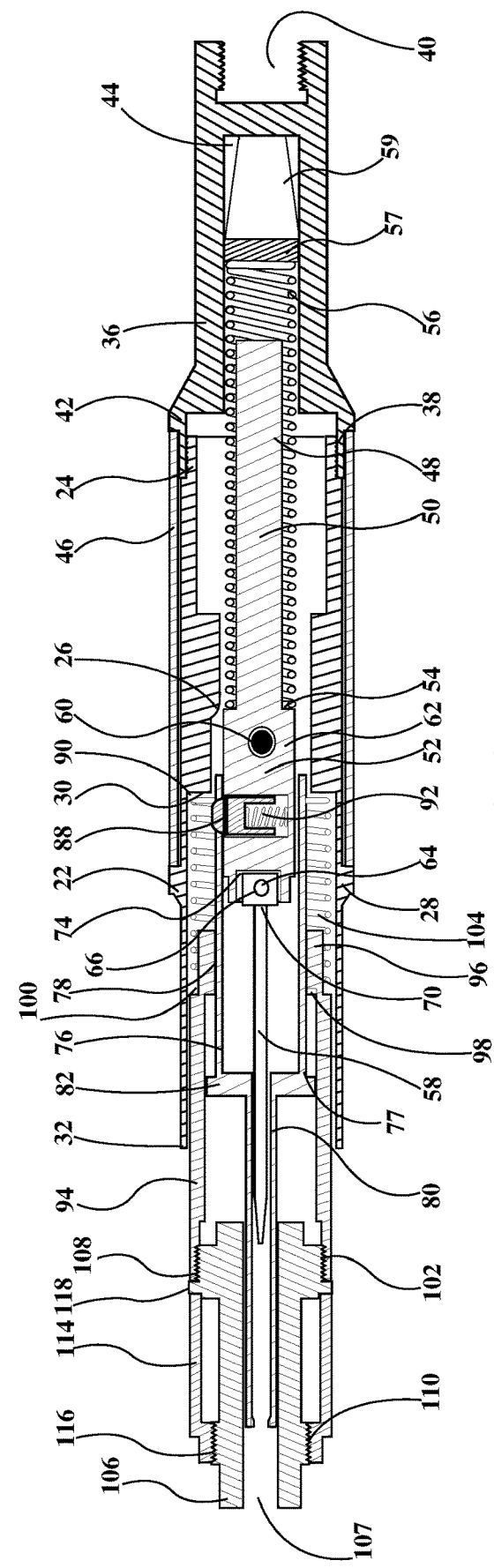
Fig.3
Fig.4

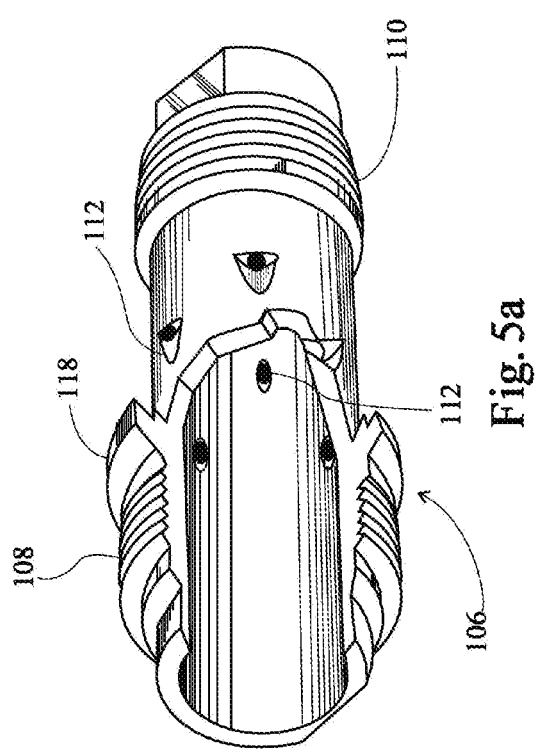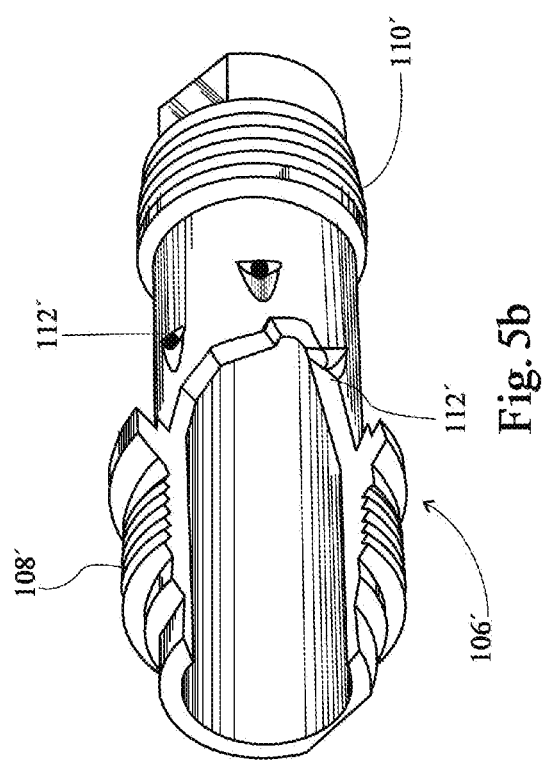

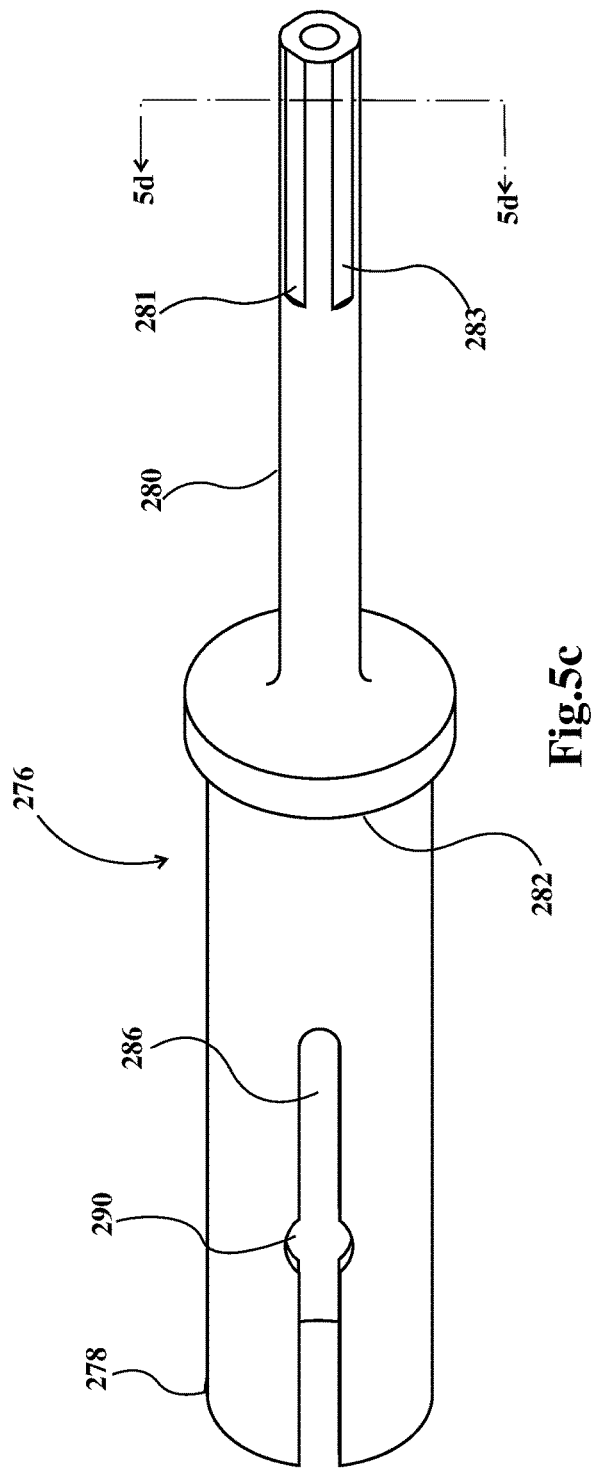
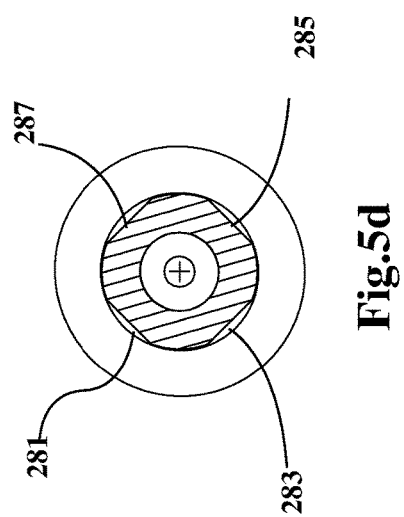
Fig.5c
Fig.5d

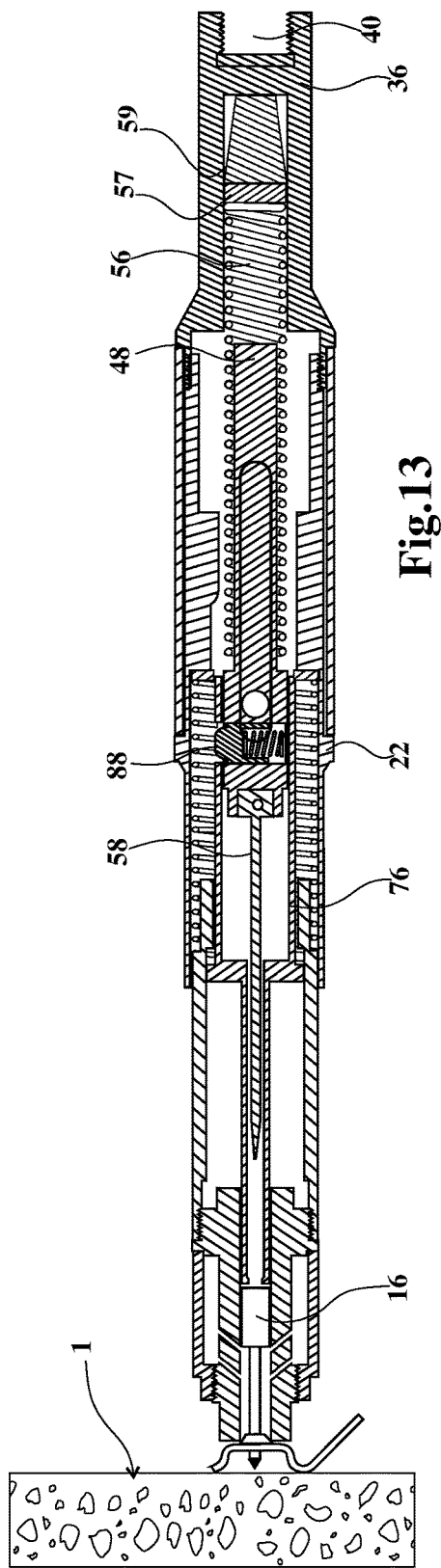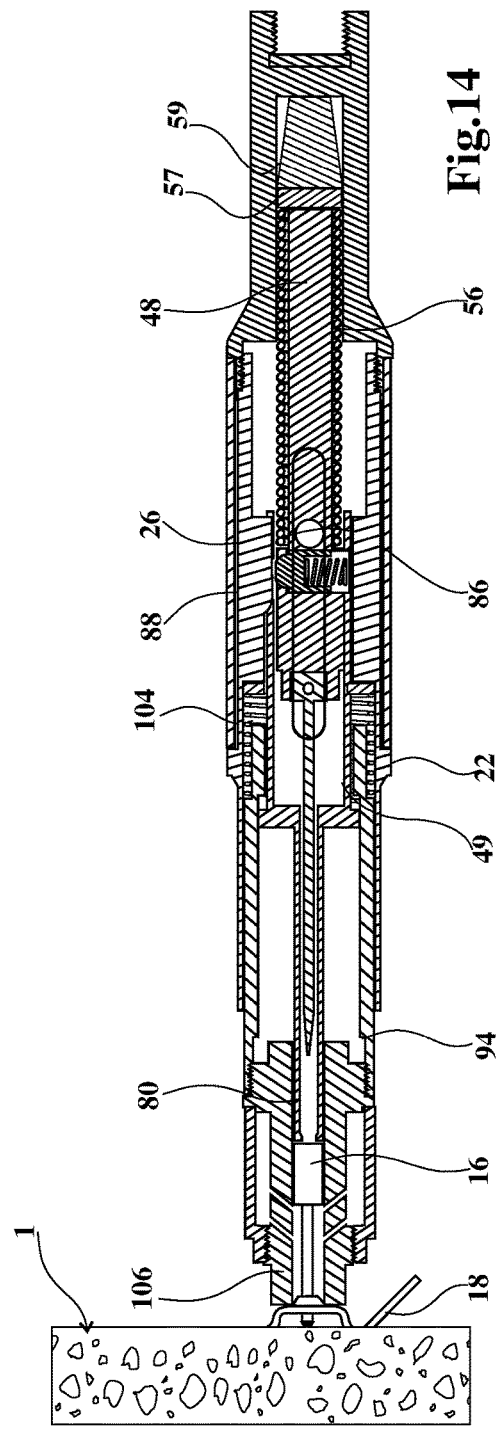

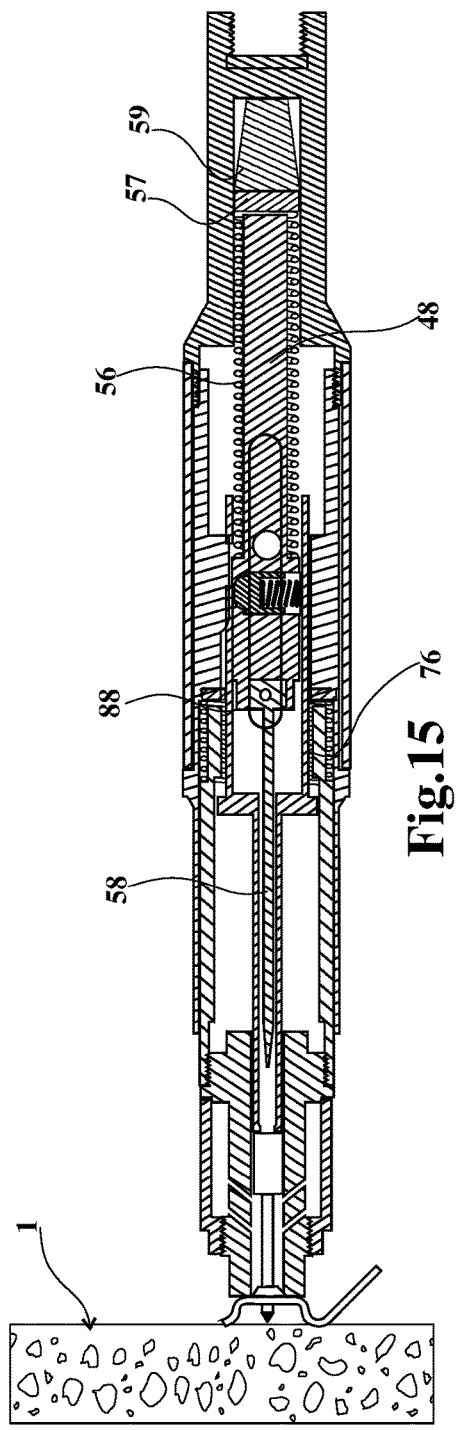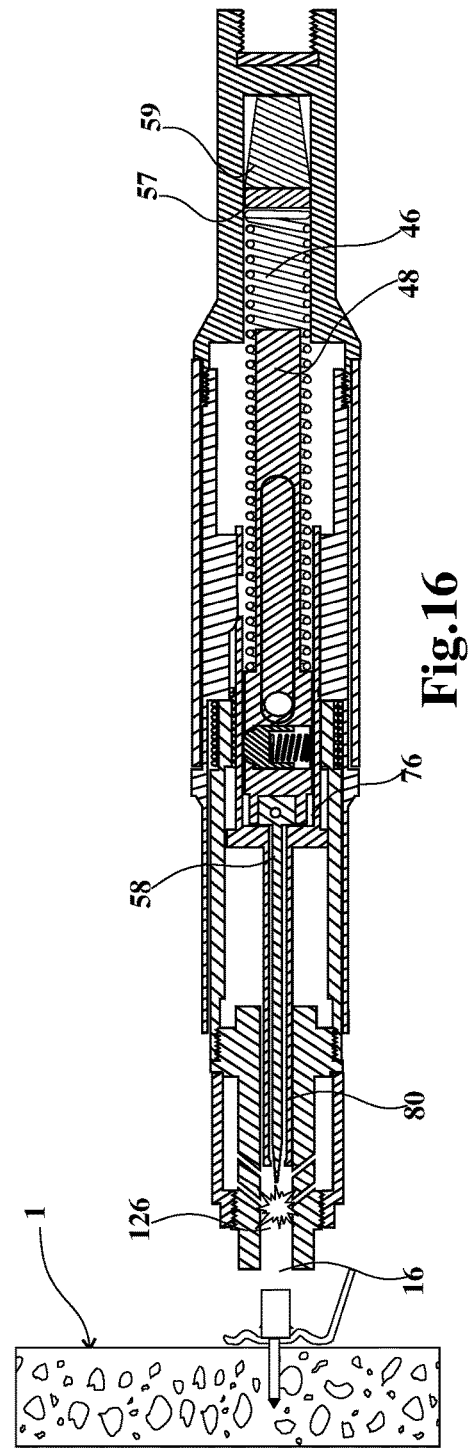

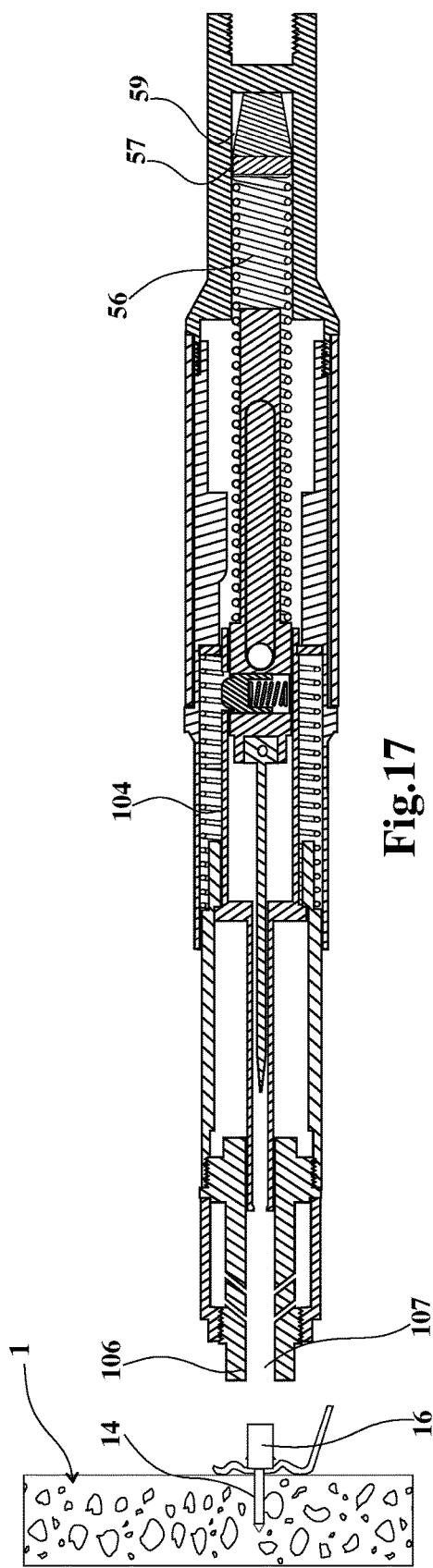
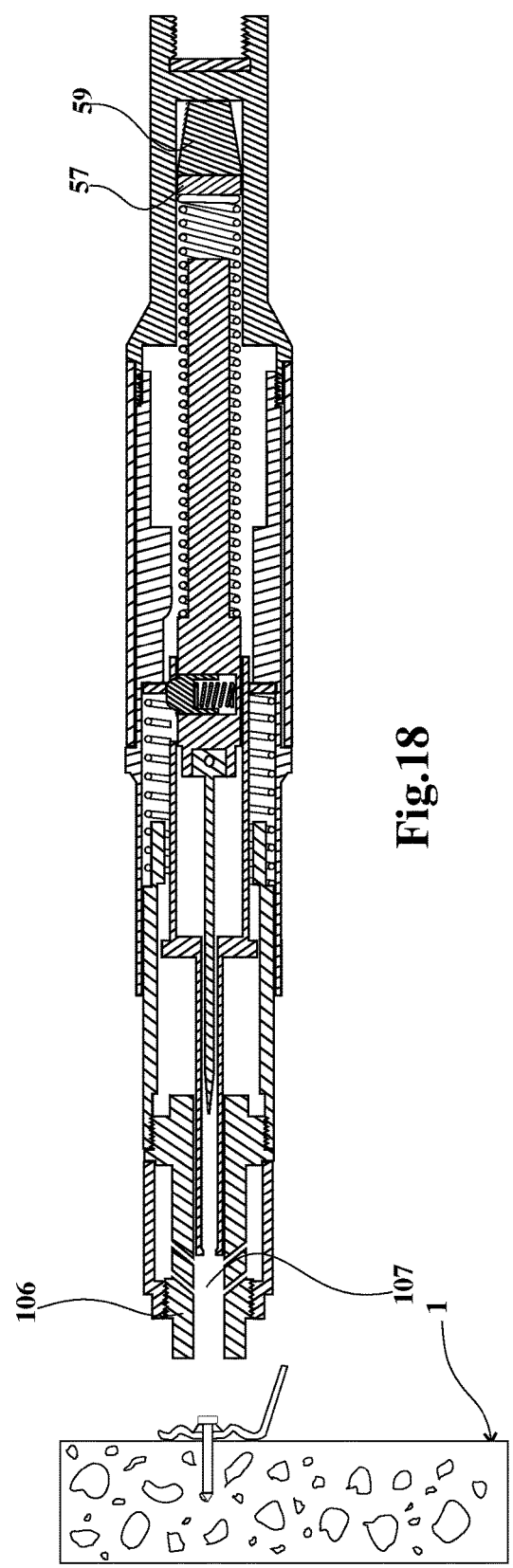
Fig.17
Fig.18

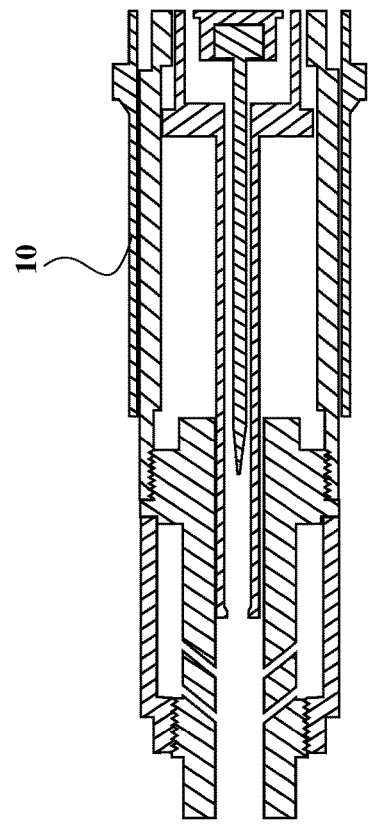
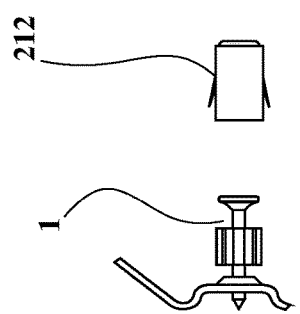
Fig.20
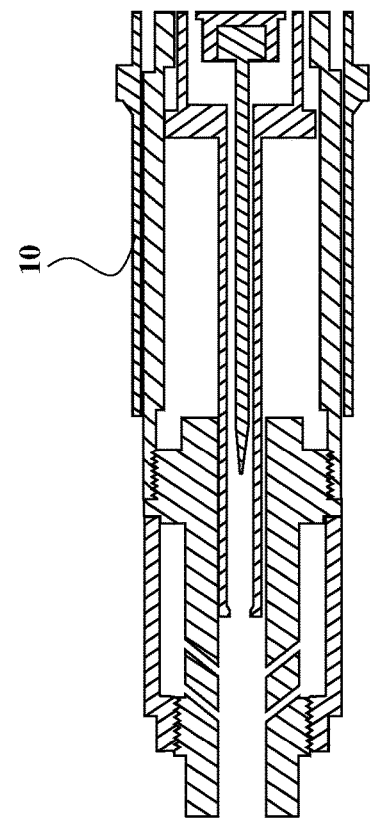
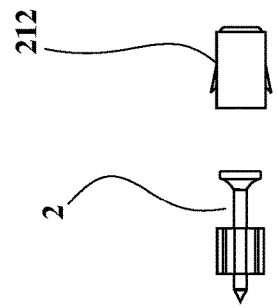
Fig.21

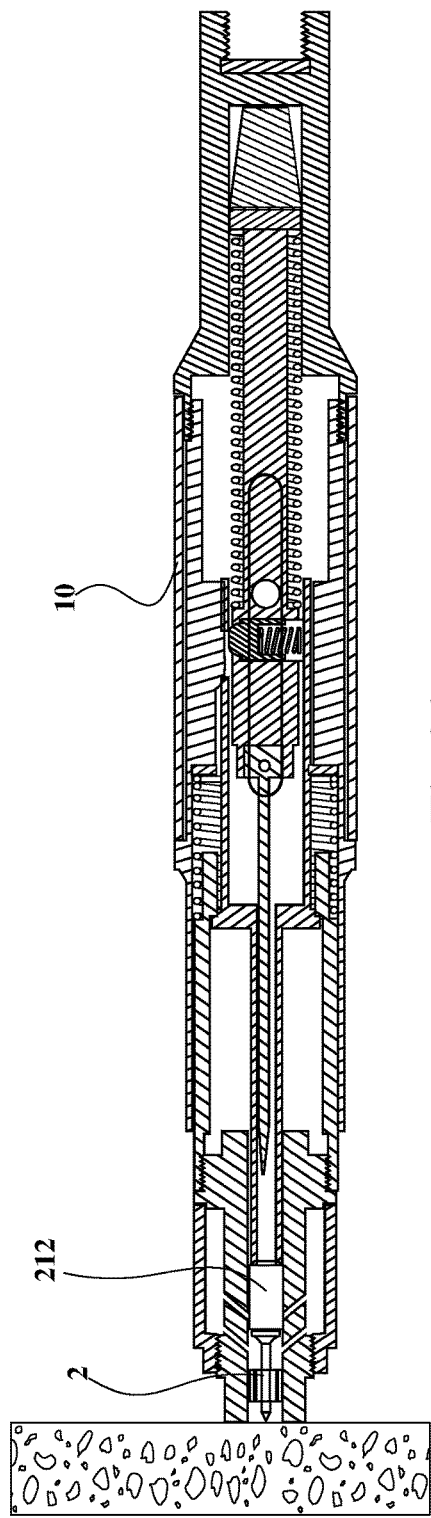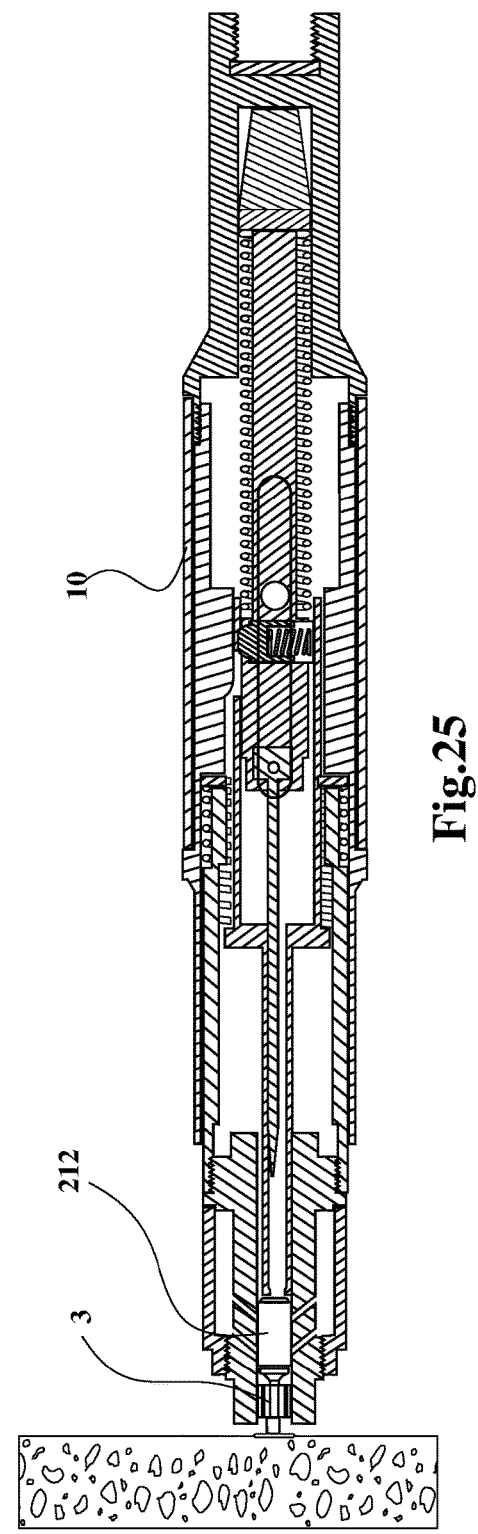

APPARATUS FOR INSTALLING FASTENERS AND EXPLOSIVE LOADS FOR USE THEREWITH

CROSS REFERENCES TO RELATED APPLICATIONS

This application is a continuation of application Ser. No. 13/567,230 filed Aug. 6, 2012 which is a continuation-in-part of application Ser. No. 12/785,674 filed May 24, 2010, which is a continuation-in-part of application Ser. No. 12/704,706 filed Feb. 12, 2010, now U.S. Pat. No. 8,397,969 issued Mar. 19, 2013, the contents of which are incorporated by reference herein.

FIELD OF THE INVENTION

This invention relates broadly to explosively driven fasteners More particularly, this invention relates to an apparatus for installing explosively driven fasteners and explosive loads for use therewith.

BACKGROUND OF THE INVENTION

Various forms of explosively actuated fastener systems have been developed to drive fasteners into hard structures such as wood, concrete, masonry and steel. A considerable advantage of using such fastener systems has been the reduced time required for installing the fasteners into hard structures. However, a major common disadvantage is that the fasteners cause high stresses when penetrating into the receiving material in the region of the fastening whereby greater spalling occurs. In addition, explosively actuated fastener systems are relatively complex in construction and costly to manufacture and, due to inadequate venting of their combustion chamber, suffer from the disadvantages that they are relatively noisy and tend to jam from a buildup of spent powder.

Explosively actuated fastener systems have been previously divided into two general groups: the low-velocity fastener system (discharging fasteners at a velocity of less than about 300 ft/sec) and the high-velocity fastener system (discharging fasteners at a velocity of greater than about 500 ft/sec). In the low velocity systems, a drive pin is positioned at the exit end of a cylindrical barrel with a piston located inwardly and spaced from the drive pin and an explosive charge located behind the piston. In the high velocity systems, a drive pin is positioned behind the piston. Some high-velocity fastener systems still have the disadvantages of high noise level, dangerous free fastener velocity and high degree of spall and ricochet when the drive pin strikes the work surface. Some low-velocity fastener systems still have the disadvantage of high noise level, power limitation, severe spall out in concrete and high incidence of drive pin damage.

With the fastener systems being ballistic in nature and the fasteners attaining free flight, the fastener systems have incurred safety concerns analogous to those of firearms. Designs of power loads have been adjusted to make systems safer, to reduce the number of required parts, and thus decrease the cost of production.

U.S. Pat. No. 3,172,123 discloses an explosive actuated tool in which a spring-loaded barrel with a bore is forced toward a work surface, thus forcing a fastener into the bore of the barrel. The fastener acts as a firing pin for igniting a power charge disposed at a head end of the fastener.

U.S. Pat. No. 3,514,025 discloses an electrically operated explosively actuated tool using a caseless cartridge.

U.S. Pat. No. 3,665,583 describes a suspension clip structure which includes a center portion and a projecting retaining flange for facilitating the holding of the suspension clip structure on a power actuated tool.

U.S. Pat. No. 3,797,721 describes an explosive actuated tool for driving a fastening stud. The tool includes a barrel with a bore. A muzzle is provided at one end of barrel and an explosion chamber communicates with the bore. A closed gas expansion chamber surrounds the barrel and communicates with the bore solely through a plurality of passageways in the barrel adjacent to the muzzle.

U.S. Pat. No. 4,830,254 describes a two-stage power driving system for powder actuated tools comprising a barrel, a piston, a first stage power load activation means and a power amplifier. The power amplifier accommodates a stacked arrangement of a fastener and a second stage power load.

U.S. Pat. No. 4,890,778 describes a hammer-activated fastener tool for driving fastener projectiles comprising a relatively movable barrel and housing components. The barrel carries a power load chamber body and a relatively movable piston member which in muzzleward movement drives the fastener object and on breechward movement achieves ejection of the spent power load cartridge. The housing carries a movable firing pin assembly.

U.S. Pat. No. 4,899,919 briefly describes a self-energizing fastener which comprises a nail and a charge pellet attached to the head of the nail. A generally cylindrical tool with an "igniting projection" is also shown.

U.S. Pat. No. 5,016,802 describes an explosive actuated extendable driving tool having a housing with a barrel at its front end for receiving a fastening element, with a load chamber in an inner end of the barrel. A manually actuated reciprocating shaft is slidably received in a retainer that is mounted to the back end of the housing. A muzzle with a self-aligning spall guard and splash guard are mounted to the barrel, with a noise suppression element being contained in a chamber formed between the spall guard and the splash guard. Exits for the discharge of combustion gases and carbon into the noise suppression element are defined by discharge ports formed in the barrel and spall guard.

U.S. Pat. No. 5,135,150 describes a pole-type powder actuated tool that includes a first pin having a flange at the top end, a second pin having a flange at the top end in contact with the flange of the first pin so that the second pin will move in unison with the first pin, a front barrel for receiving a drive pin and cartridge, a rear barrel for accommodating the second pin and part of the first pin and engaged with the front barrel at one end and with a connecting pipe at the other end, two springs enclosing the first pin and second pin for forcing the two pins to the normal position after fired.

U.S. Pat. Nos. 5,544,800, 5,497,929, and 5,423,469 describe a system for driving a fastener into a work surface. The system includes a fastener having a penetration end, a shaft and a receptacle head end for receiving a power charge and a tool having a reciprocating firing pin. The tool includes a barrel with a bore having a muzzle for receiving the fastener, a spring-biased firing pin and an exhaust chamber connected to the bore for receiving exhaust gases.

U.S. Pat. No. 5,904,284 describes an explosively actuated fastener system. The explosively actuated fastener system includes a front end; a back end; an open-ended muzzle being positioned adjacent to the front end of the fastener system; an open-ended outer tubular member having a front end and a back end; an open-ended tubular cap being attached to the back end of the outer tubular member and having a front end and a back end and an inward circular protrusion at the back end; an open-ended barrel member including an axial, central bore and extending from within, being an integral continuation of, and thus connecting, the muzzle to the outer tubular member; an open-ended inner tubular member having a front end and a back end, with an outward circular protrusion and an inward circular protrusion being positioned at the front end; a reciprocating ejector comprising a retaining section positioned in the inner tubular member, an outward circular protrusion and a firing rod, that extends forwardly from the retaining section, that comprises a front section, a middle section and a back section and that is separated from the retaining section by the outward circular protrusion; an ejector housing being used for accommodating the reciprocating ejector and including a tube, an outward circular protrusion and a firing pin that extends forwardly from the tube, with the tube including a closed top, an open bottom, a front section that is smaller in diameter than the axial, central bore of the barrel member, a middle section and a back section that is separated from the middle section by the outward circular protrusion and that has a number of perforations; a forward spring being positioned within the inner tubular member; a balancing spring being positioned within the outer tubular member; a handle being attached to and serving as a closure for the back end of the inner tubular member; an open-ended sliding guide including a tubular main body and a front part that at its front edge has an inward circular protrusion and being positioned in front of the outward circular protrusion of the inner tubular member and within the outer tubular member; a reset spring being fitted around the front part of the sliding guide and being positioned between the outward circular protrusion of the ejector housing and the main body of the sliding guide and a pin means being fitted in the number of perforations in the back section of the ejector housing.

According to the method of the '284 patent, the handle is first pulled backwards to manually reset the fastener system. The backward movement of the inner tubular member results in opening up of the reset spring, causes the sliding guide to move backward and, thus, causes the pin means to lock. Upon pulling the handle to bring the fastener system to a set position, the handle is pushed forward. The forward push on the handle results in compression of the forward spring and build-up of a striking force that forces the inner tubular member to move forward. The forward movement of the inner tubular member causes the sliding guide to move forward and results in compression of the reset spring. The pin means is unlocked, allowing the forward spring to open up, and the firing rod moves forward, pushed by the opening forward spring, in the ejector housing and strikes front of the tube and the firing pin of the ejector housing which initiates deflagration or detonation of a solid propellant pill.

OBJECTS OF THE INVENTION

It is therefore an object of the invention to provide an improved tool for installing an explosively driven fastener as well as an improved explosively driven fastener for use therewith.

SUMMARY OF THE INVENTION

In accord with these objects, which will be discussed in detail below, the tool according to the invention includes a cylindrical main body having a proximal threaded end, an internal trigger key, an external annular flange, and an internal spring stop distal of the trigger key, the main body defining a diametrical slot which extends a distance between its proximal and distal ends. As used herein the term "proximal" means closest to the tool operator and the term "distal" means distant from the tool operator, i.e. closest to the fastener.

The proximal threaded end of the main body is coupled to a cylindrical tool base having a distal threaded end (for coupling to the main body), a proximal threaded end (for coupling to a pole), an external annular flange, and an internal spring receiving recess. The distal threaded end of the tool base is threadably coupled to the proximal threaded end of the main body. A cylindrical outer cover extends over a proximal portion of the main body and a distal portion of the tool base, the cover being embraced by the respective external annular flanges of the main body and the tool base.

A firing pin holder having a proximal end and a distal end with a stepped diameter defining a spring stop therebetween is arranged coaxially within the main body. A main spring is mounted coaxially on the proximal end of the firing pin holder and extends, together with a portion of the proximal end of the firing pin holder, into the spring receiving recess of the tool base. A firing pin is coupled to the distal end of the firing pin holder. The firing pin holder is provided with a diametrical main assembly pin which passes through a diametrical hole in the firing pin holder and engages the diametrical slot of the main body. The assembly pin and slot engagement limit the longitudinal movement of the firing pin holder and the main body relative to each other. The firing pin holder and firing pin together are referred to as the firing pin assembly.

A firing pin assembly guide is arranged coaxially between the firing pin assembly and the main body. The firing pin assembly guide has a relatively large diameter proximal end, a relatively small diameter distal end, and an external annular flange therebetween. The relatively large diameter proximal end receives the distal end of the firing pin holder and is provided with a diametrical slot which also received the main assembly pin. The small diameter distal end receives the firing pin. In addition, the firing pin assembly guide is provided with a keyway which is arranged to receive the trigger key of the main body as well as a radially biased trigger which extends from the firing pin holder. The keyway is arranged to allow longitudinal movement of the trigger key relative to the firing pin assembly guide and prevent longitudinal movement of the trigger (and thus the firing pin assembly) relative to the firing pin assembly guide when the trigger is radially biased into the keyway. Longitudinal distal movement of the main body causes the trigger key to ride over the radially biased trigger and disengage it from the keyway thereby allowing longitudinal movement of the firing pin assembly relative to the firing pin assembly guide.

An inner sleeve has a reduced diameter proximal end defining internal and external annular flanges and a threaded distal end. The inner sleeve is coaxially mounted between the firing pin assembly guide and the main body with the internal annular flange of the inner sleeve cooperating with the external annular sleeve of the firing pin assembly guide to limit distal movement of the inner sleeve. A reset spring is mounted over the proximal end of the inner sleeve and is captured between the external annular flange of the inner sleeve and the internal spring stop of the main body.

A muzzle having proximal threads and distal threads is coupled by its proximal threads to the threaded distal end of the inner sleeve. The muzzle defines a throughbore which receives the distal end of the firing pin assembly guide leaving a distal space to receive the proximal end of an explosively driven fastener. The muzzle has a plurality of exhaust bores extending outward from the throughbore to the outer surface of the muzzle. A debris cup is coaxially mounted over the muzzle and coupled to it via the muzzle's distal threads. The debris cup catches exhaust debris that exits the muzzle throughbore via the exhaust bores. According to one aspect of the invention, a plurality of interchangeable muzzles are provided. Each muzzle has a different number of exhaust bores. The number of exhaust bores influences the force with which the explosively driven fastener will impact the surface into which it is fired.

An explosively driven fastener according to the invention includes a nail having a pointed distal end and a proximal nail head. The nail head is mounted inside a plastic cap containing a buffer and a nitrocellulose load. Preferably, a spacer is arranged between the buffer and the load creating an air space between the buffer and the load. The nail is advantageously mounted in an angle bracket which will be affixed to a surface by the nail after the nail is driven. In addition, a rubber seal is preferably arranged on the nail between the bracket and the plastic cap. The plastic cap is preferably provided with outwardly extending flutes or wings. Because of the provision of different muzzles, it is possible to provide fasteners with a uniform standard load rather than different loads for different surfaces.

In operation, an explosively driven fastener is inserted into the distal end of the muzzle throughbore. More particularly, the plastic cap is inserted into the throughbore until the bracket abuts the distal end of the muzzle. The fastener bracket is aligned with a surface to be penetrated by the nail and the tool base is pushed distally towards the surface. Distal movement of the tool base moves the main body, the main spring and the firing pin assembly, all distally. Distal movement of the firing pin assembly causes distal movement of the firing pin assembly guide since they are locked together by the radially biased trigger. The distal end of the firing pin assembly guide abuts the proximal end of the fastener (the plastic cap containing the load) which prevents further distal movement of the firing pin assembly guide. In addition, distal movement of the main body causes compression of the reset spring as it is biased against the inner sleeve which is prevented from distal movement by the muzzle which abuts the fastener bracket which abuts the surface to be penetrated. Further distal movement of the tool base therefore compresses the main spring against the firing pin holder and continues to move the main body distally relative to the firing pin assembly and guide, also further compressing the reset spring. Continued distal movement causes the key of the main body to enter the keyway of the firing pin assembly guide and ride over the radially biased trigger depressing the trigger radially inward. Radial depression of the trigger disengages the firing pin assembly from the firing pin assembly guide allowing it to move freely longitudinally distally. The compressed main spring then forces the firing pin assembly in the distal direction with the firing pin traveling through the distal end of the firing pin assembly guide (which is held against distal movement by the fastener) until the firing pin exits the firing pin assembly guide and impacts the proximal end of the fastener striking the explosive load. The load explodes forcing the nail out of the muzzle and into the surface to be penetrated.

When the tool is moved away from the fastener, the actions of the springs automatically resets the tool. Sometimes the spent load container remains lodged inside the tool. Movement of the muzzle in the proximal direction brings the proximal end of the spent load container into engagement with the distal end of the firing pin assembly guide and causes the spent load container to be ejected.

The apparatus according to the invention obviates the need to purchase separate loads for the tool and there is no need to place fasteners and loads into the tool separately. The tool is easily assembled and disassembled for cleaning and is preferably made entirely of stainless steel. Since the nail is directly propelled by the explosive rather than by a driver propelled by explosive, better nail penetration is achieved. In addition, there is no need to replace drivers which wear after repeated impact against nail heads. Further, the absence of a driver results in the absence of vibration when the tool is in use. This results in greater accuracy and less noise. The nail penetrates much faster and thus results in a lower failure rate. The slim profile of the tool allows it to fit into tight spaces such as between ductwork, pipes, etc. The tool automatically triggers and is automatically reset after use.

The construction of the tool renders it lighter. The tool in combination with the provided fastener is quieter than powder actuated tools. This is important when working in an occupied building. The plastic cap on the nail contains the energy that would otherwise escape and cause noise.

Additional objects and advantages of the invention will become apparent to those skilled in the art upon reference to the detailed description taken in conjunction with the provided figures.

BRIEF DESCRIPTION OF THE DRAWINGS

FIG. 3 is a side elevation view of a tool and fastener according to the invention;

FIG. 4 is a longitudinal cross section taken along line 4-4 in FIG. 1;

FIG. 5a is a broken perspective view of a first muzzle configuration;

FIG. 5b is a broken perspective view of a second muzzle configuration;

FIG. 5c is a perspective view of an alternate embodiment of a firing pin assembly guide;

FIG. 5d is a sectional view taken along line 5d-5d in FIG. 5c;

FIGS. 12-18 are views similar to FIG. 4 showing the tool and fastener is stages of operation;

FIG. 20 is an exploded view including a broken longitudinal section of the end of a tool according to the invention, and side elevation views of an explosive load according to the invention and a prior art fastener;

FIGS. 21 and 22 are views similar to FIG. 20 with different prior art fasteners; and FIGS. 23-25 are views similar to FIGS. 20-22 but show the tool, load and fastener assembled and ready to fire.

DETAILED DESCRIPTION OF THE INVENTION

Figure 1:
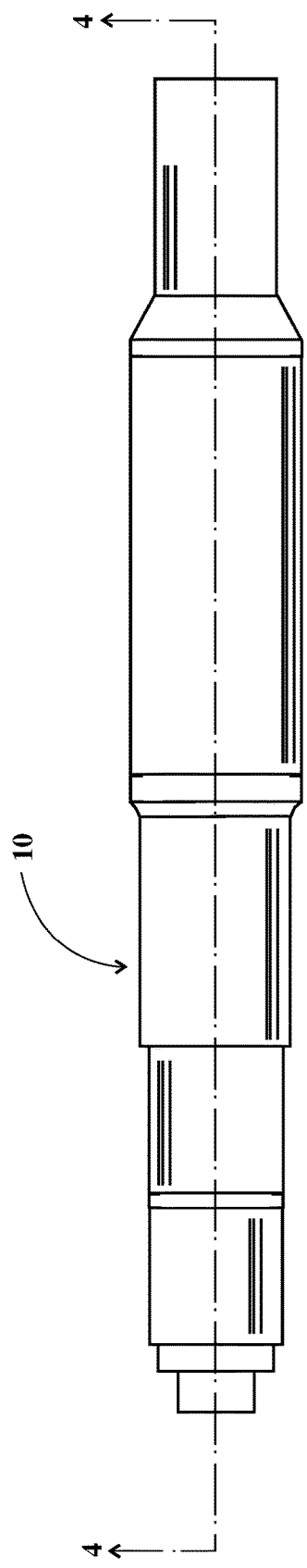
FIG. 1 is a side elevation view of a tool according to the invention.
Figure 2:
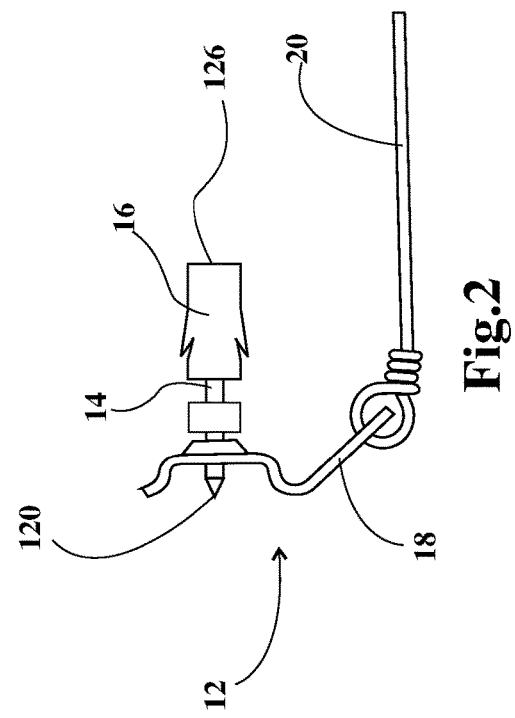
FIG. 2 is a side elevation view of a fastener according to the invention.

Turning now to FIGS. 1-3, the invention includes an apparatus 10 for installing an explosively driven fastener 12. The fastener 12 (described in more detail below with reference to FIGS. 8-11) typically includes a nail 14, an explosive load 16, and an angle bracket 18 which is coupled to a suspension wire 20.

Turning now to FIGS. 4-7, the tool 10 according to the invention includes a cylindrical main body 22 having a proximal threaded end 24, an internal trigger key 26, an external annular flange 28, an internal spring stop 30 distal of the trigger key 26, and a distal end 32. The main body 22 defines a diametrical slot 34 which extends a distance between the main body proximal end 24 and distal end 32. As used herein the term "proximal" means closest to the tool operator and the term "distal" means distant from the tool operator, i.e. closest to the fastener.

The proximal threaded end 24 of the main body 22 is coupled to a cylindrical tool base 36 having a distal threaded end 38 (for coupling to the threaded end 24 of the main body 22), a proximal threaded end 40 (for coupling to a pole, not shown), an external annular flange 42, and an internal spring receiving recess 44. The distal threaded end 38 of the tool base is threadably coupled to the proximal threaded end 24 of the main body 22. A cylindrical outer cover 46 extends over a proximal portion of the main body 22 and a distal portion of the tool base 36, the cover 46 being embraced by the external annular flange 28 of the main body 22 and the external annular flange 42 of the tool base 36. As used herein, the main body 22 coupled to the tool base 36 are said to comprise the "trigger body".

A firing pin holder 48 having a proximal end 50 and a distal end 52 with a stepped diameter defining a spring stop 54 therebetween is arranged coaxially within the main body 22. A main spring (firing spring) 56 is mounted coaxially on the proximal end 50 of the firing pin holder 48 and extends from the spring stop 54, together with a portion of the proximal end 50 of the firing pin holder 48, into the spring receiving recess 44 of the tool base 36. A firing pin 58 is coupled to the distal end 52 of the firing pin holder 48. According to the presently preferred embodiment, a steel disk 57 and a frustroconical rubber buffer 59 are located behind the main spring 56 as shown best in FIG. 4. These parts act as shock absorbers.

The firing pin holder 48 is provided with a diametrical main assembly pin 60 which passes through a diametrical hole 62 in the firing pin holder 48 and engages the diametrical slot 34 of the main body 22. The assembly pin 60 and slot 34 engagement limit the longitudinal movement of the firing pin holder and the main body relative to each other. The firing pin 58 is coupled to the firing pin holder 48 by a pin 64 which engages a diametrical hole 66 in the firing pin and a diametrical hole 68 in the firing pin holder. More specifically, the firing pin 58 has a proximal head 70 which defines the diametrical hole 66 and a pointed distal end 72. The head 70 is received in a recess 74 at the distal end of the firing pin holder 48. The coupled firing pin holder 48 and firing pin 58 together are referred to as the firing pin assembly.

A firing pin assembly guide 76 is arranged coaxially between the firing pin assembly 48, 58 and the main body 22. The firing pin assembly guide 76 has a relatively large diameter proximal end 78, a relatively small diameter distal end 80, and an external annular flange 82 therebetween. The relatively large diameter proximal end 78 receives the distal end 52 of the firing pin holder 48 and is provided with a diametrical slot 84 which also receives the main assembly pin 60. The small diameter distal end 80 receives the firing pin 58. In addition, the firing pin assembly guide 76 is provided with a keyway which is arranged to receive the trigger key 26 of the main body 22 as well as a radially biased trigger 88 which extends from the firing pin holder 48. The keyway 86 is arranged to allow longitudinal movement of the trigger key 26 relative to the firing pin assembly guide 76 and prevent longitudinal movement of the trigger (and thus the firing pin assembly) relative to the firing pin assembly guide when the trigger 88 is radially biased into the keyway 86. More particularly, the keyway 86 has a circular stop 90 which intersects the keyway 86 and receives the trigger 88 which is biased into the stop by a spring 92. Longitudinal distal movement of the main body 22 relative to the firing pin assembly guide 76 causes the trigger key 26 (which has a smooth distal edge) to ride over the radially biased trigger 88 and disengage the trigger 88 from the keyway 86 thereby allowing longitudinal movement of the firing pin assembly 48, 58 relative to the firing pin assembly guide 76.

Figure 12:
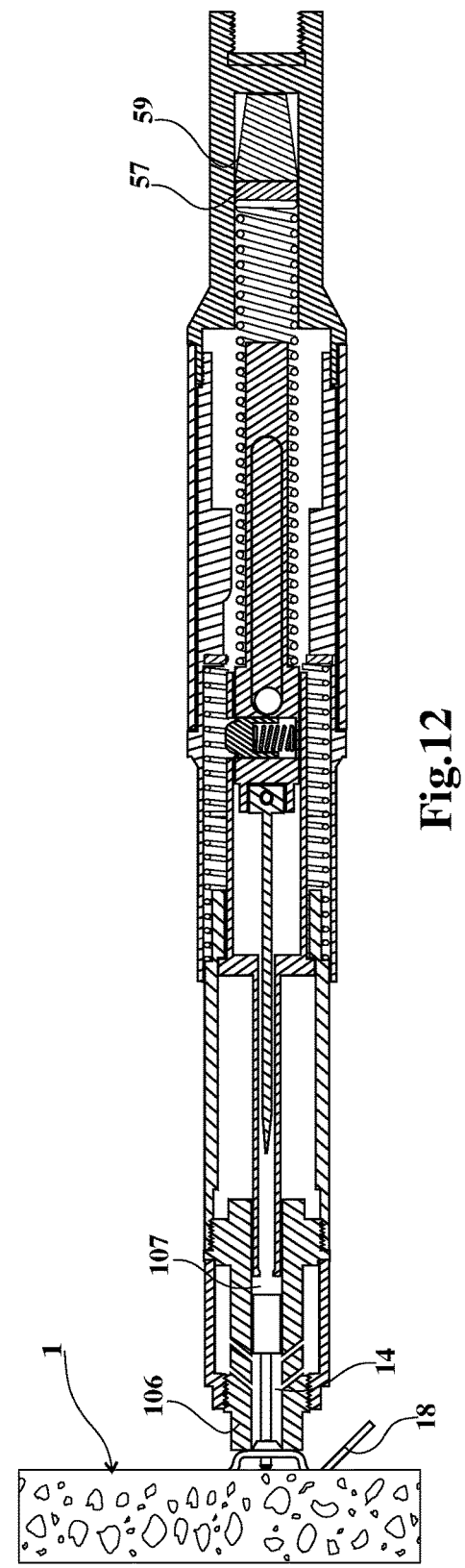

An inner sleeve 94 has a reduced diameter proximal end 96 defining an internal annular flange 98, an external annular flange 100 and a threaded distal end 102. The inner sleeve 94 is coaxially mounted between the firing pin assembly guide 76 and the main body 22 with the internal annular flange 98 of the inner sleeve 94 cooperating with the external annular flange 82 of the firing pin assembly guide 76 to limit distal movement of the inner sleeve 94 (see FIG. 12, e.g.). A reset spring 104 is mounted over the proximal end 96 of the inner (reset) sleeve 94 and is captured between the external annular flange 100 of the inner sleeve 94 and the internal spring stop 30 of the main body 22. According to the presently preferred embodiment, a TEFLON ring 77 is located on the proximal side of the annular flange 82. The ring 77 reduces the shock when the firing pin guide is propelled backward and the flange 82 is moved toward the flange 98.

Figure 5:
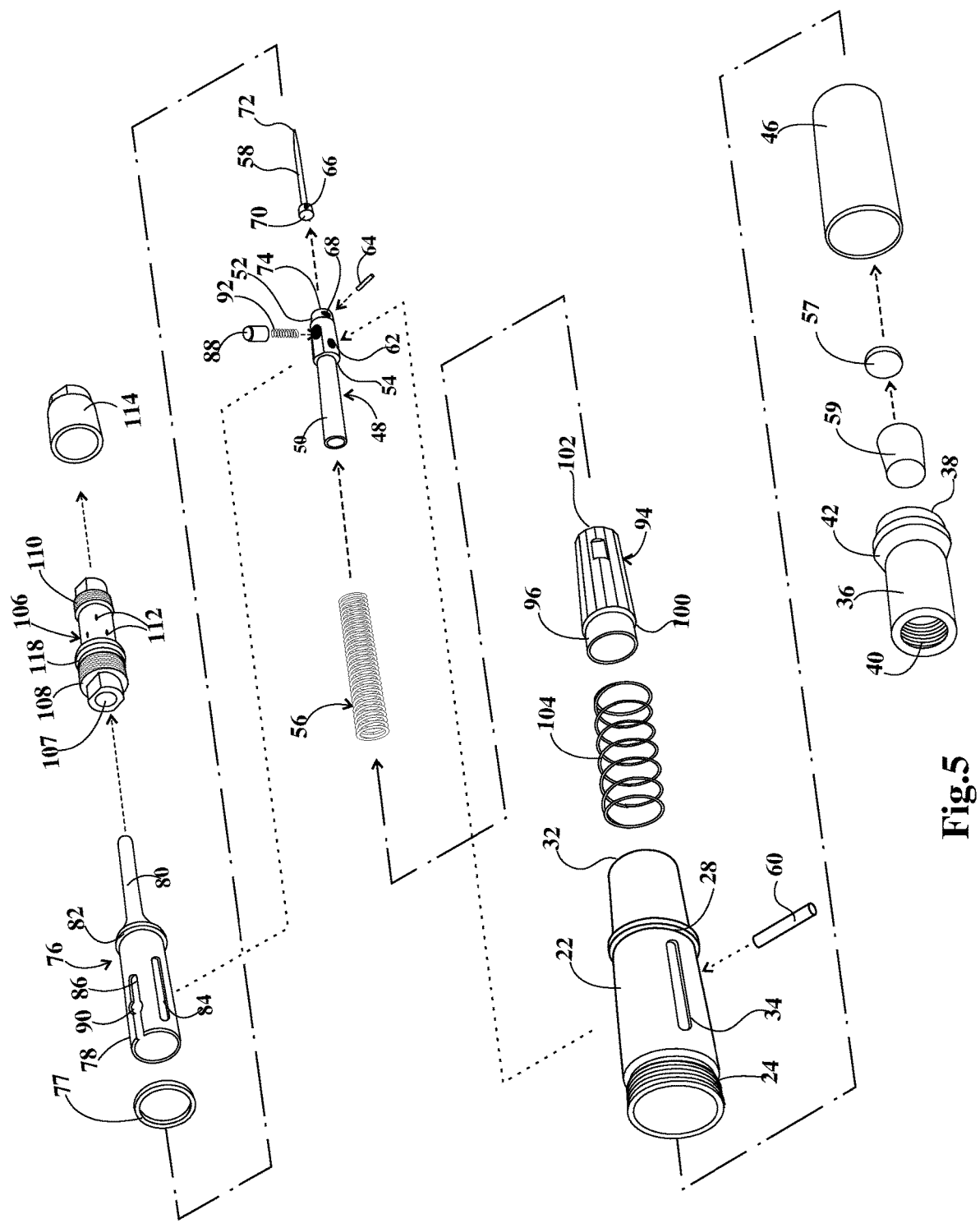
FIG. 5 is an exploded perspective view of a tool according to the invention.
Figure 6:
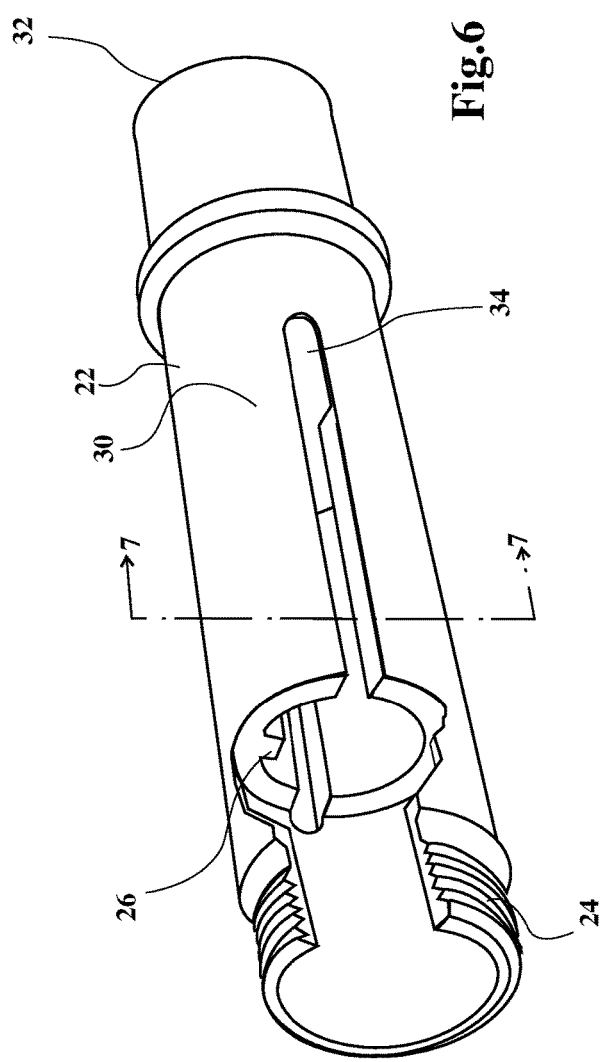
FIG. 6 is a cut away view of the main body component of FIG. 5.
Figure 7:
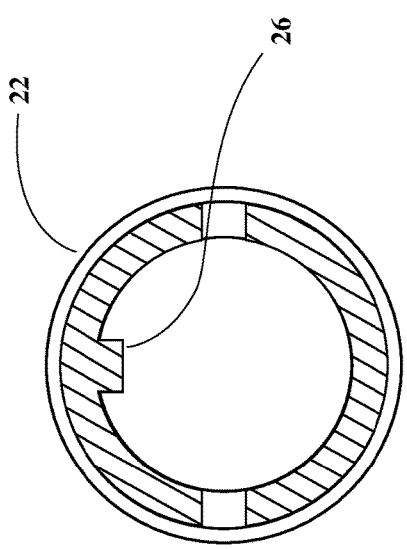
FIG. 7 is a section taken along line 7-7 in FIG. 6.
Figure 10:
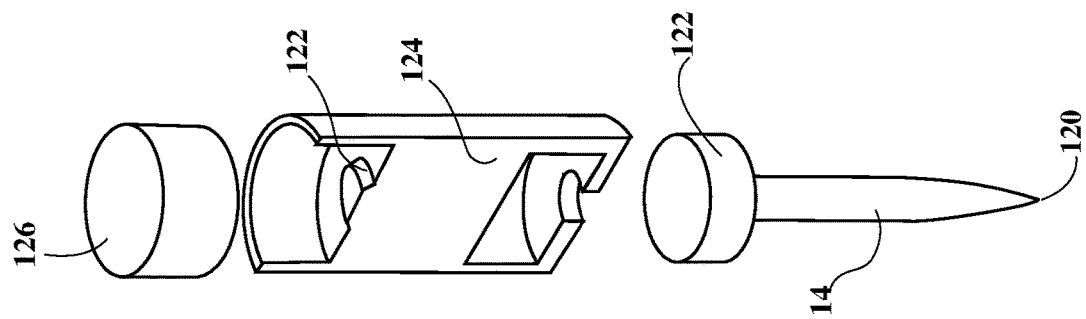
FIG. 10 is an exploded partially broken perspective view of the fastener.
Figure 9:
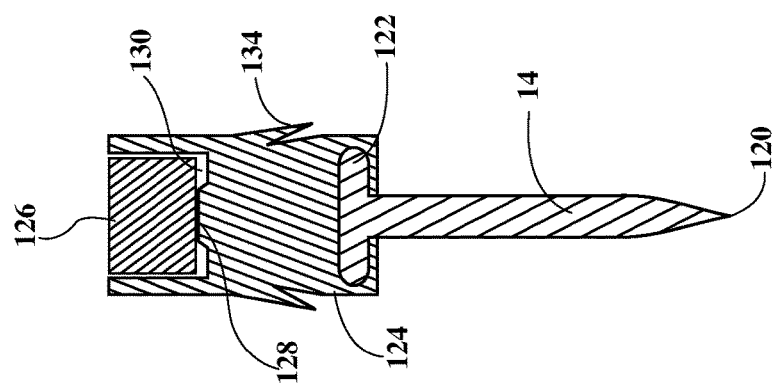
FIG. 9 is a section taken along line 9-9 in FIG. 8.
Figure 8:
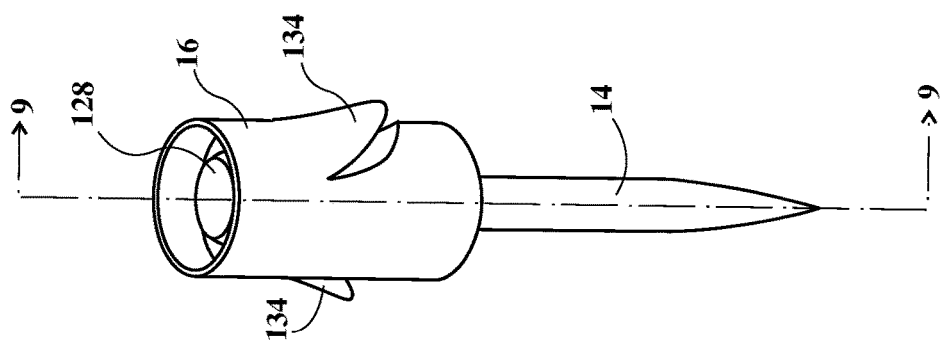
FIG. 8 is a perspective view of a fastener according to the invention.

A muzzle 106 having proximal threads 108 and distal threads 110 is coupled by its proximal threads 108 to the threaded distal end 102 of the inner sleeve 94. The muzzle 106 defines a throughbore 107 which receives the distal end 80 of the firing pin assembly guide 76 leaving a distal space to receive the proximal end of an explosively driven fastener (described below with reference to FIGS. 9-19). The muzzle 106 has a plurality of exhaust bores 112 extending outward from the throughbore 107 to the outer surface of the muzzle. The number, location and configuration of the exhaust bores 112 may be varied to affect the operation of the explosive load. For example, FIGS. 5 and 5a illustrate a muzzle having six exhaust bores 112 which are staggered longitudinally in two groups of three bores arranged approximately one hundred twenty degrees apart. The bores are not perfectly radial but are angled proximally, i.e. in the direction taken by exhaust from the explosive load. FIG. 5b illustrates an alternative muzzle 106' having the same threads 108', 110' as the threads 108, 110 in the muzzle 106. Thus, the muzzles 106 and 106' are interchangeable in the tool 10. The exhaust bores 112' in the muzzle 106' are fewer in number, thus allowing less exhaust from the exploding load. From the foregoing, those skilled in the art will appreciate that the fewer the exhaust bores, the greater the explosive force will be on the fastener.

According to an alternate embodiment, shown in FIGS. 5c and 5d, a slightly different firing pin assembly guide 276 is provided. The firing pin assembly guide 276 is similar to the firing pin assembly guide 76 (FIG. 5) with similar numerals (increased by 200) referring to similar features. There is a relatively large diameter proximal end 278, a relatively small diameter distal end 280, and an external annular flange 282 therebetween. The relatively large diameter proximal end 278 receives the distal end 52 of the firing pin holder 48 (FIG. 5) and is provided with a diametrical slot (not shown) which also receives the main assembly pin 60. The small diameter distal end 280 receives the firing pin 58. In addition, the firing pin assembly guide 276 is provided with a keyway 286 which is arranged to receive the trigger key 26 of the main body 22 as well as the radially biased trigger 88 which extends from the firing pin holder 48. The keyway 286 is arranged to allow longitudinal movement of the trigger key 26 relative to the firing pin assembly guide 276 and prevent longitudinal movement of the trigger (and thus the firing pin assembly) relative to the firing pin assembly guide when the trigger 88 is radially biased into the keyway 286. More particularly, the keyway 286 has a circular stop 290 which intersects the keyway 286 and receives the trigger 88 which is biased into the stop by the spring 92. Longitudinal distal movement of the main body 22 relative to the firing pin assembly guide 276 causes the trigger key 26 (which has a smooth distal edge) to ride over the radially biased trigger 88 and disengage the trigger 88 from the keyway 286 thereby allowing longitudinal movement of the firing pin assembly 48, 58 relative to the firing pin assembly guide 276.

The firing pin assembly guide 276 is also provided with a plurality of circumferential grooves 281, 283, 285, 287 extending along at least part of the relatively small diameter distal end 280 of the firing pin assembly guide 276. The firing pin assembly guide 276 may be preferable to the firing pin assembly guide 76 where the tool is made with relatively large dimensions. The grooves 281, 283, 285, 287 supplement the exhaust bores 112 of the muzzle 106 (FIGS. 5, 5a, and 5b) by allowing some exhaust to vent through the main body of the tool. This makes the larger tools much quieter.

A debris cup 114 is coaxially mounted over the muzzle 106 and coupled to it via the muzzle's distal threads 110. The debris cup 114 catches exhaust debris that exits the muzzle throughbore via the exhaust bores 112. A flange 118 on the muzzle separates the distal end 102 of the inner sleeve 94 from the proximal end of the cup 114. Distal inner threads 116 on the debris cup anchor it to the distal outer threads 110 of the muzzle 106.

Figure 11:
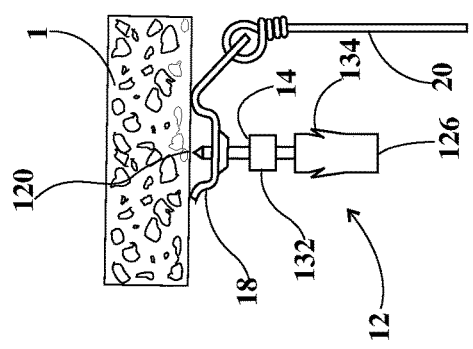
FIG. 11 is a side elevation view of a fastener arranged next to a concrete surface.

Referring now to FIGS. 8-11, an explosively driven fastener 12 according to the invention includes a nail 14 having a pointed distal end 120 and a proximal nail head 122. The nail head 122 is mounted inside a plastic cap 16 containing a buffer 124 and a nitrocellulose load 126. Preferably, a spacer 128 is arranged between the buffer 124 and the load 126 creating an air space 130 between the buffer and the load. The nail 14 is advantageously mounted in an angle bracket 18 which will be affixed to the surface of material 1 (which may be concrete, wood, masonry, steel, etc.) by the nail 14 after the nail is driven. In addition, as shown in FIG. 11, a rubber seal 132 is preferably arranged on the nail 14 between the bracket 18 and the plastic cap 16. The seal 132 and the buffer 124 both act to silence the explosion of the load 126 without significantly diminishing the impact on the nail. The plastic cap 16 also tends to guide the nail during penetration allowing the nail to penetrate more deeply into hard surfaces. The plastic cap is preferably provided with outwardly extending flutes or wings 134. The wings help hold the fastener in the tool until the fastener is fired.

Operation of the tool and fastener is illustrated in the sequence of FIGS. 12-19. In operation, an explosively driven fastener 12 is inserted into the distal end of the muzzle 106 throughbore 107. More particularly, the plastic cap is inserted into the throughbore until the bracket 18 abuts the distal end of the muzzle 106. The fastener bracket 18 is aligned with a surface to be penetrated by the nail 14 (FIG. 12) and the tool base 36 is pushed distally (FIG. 13) towards the surface (from right to left as shown in the FIGS.). This is typically accomplished by an operator pushing a pole (not shown) which is attached to the threads 40 of the tool base 36. Also, this movement is typically upward into a ceiling structure. Distal movement of the tool base 36 moves the main body 22, the main spring 56 and the firing pin assembly 48, 58 all distally. Distal movement of the firing pin assembly causes distal movement of the firing pin assembly guide 76 (FIGS. 13 and 14) since they are locked together by the radially biased trigger 88. The distal end 80 of the firing pin assembly guide 76 abuts the proximal end of the fastener (the plastic cap 16 containing the load 126, FIG. 13 et seq.) which prevents further distal movement of the firing pin assembly guide 76. In addition, distal movement of the main body 22 causes compression of the reset spring 104 (FIG. 14) as it is biased against the inner sleeve 94 which is prevented from distal movement by the muzzle 106 which abuts the fastener bracket 18 which abuts the surface to be penetrated. Further distal movement of the tool base 36 therefore compresses the main spring 56 against the firing pin holder 48 (FIG. 14) and continues to move the main body 22 distally relative to the firing pin assembly 48, 58 and guide 76, also further compressing the reset spring 104. Continued distal movement causes the internal trigger key 26 of the main body 22 to enter the keyway 86 of the firing pin assembly guide 76 and ride over the radially biased trigger 88 depressing the trigger radially inward (FIG. 14). Radial depression of the trigger 88 disengages the firing pin assembly 48, 58 from the firing pin assembly guide 76 allowing it to move freely longitudinally distally (FIG. 15). The compressed main spring 56 then forces the firing pin assembly 48, 58 in the distal direction with the firing pin 58 traveling through the distal end 80 of the firing pin assembly guide 76 (which is held stationary against distal movement by the fastener, plastic cap 16) until the firing pin 58 exits the firing pin assembly guide 76 and impacts the proximal end of the fastener striking the explosive load 126 (FIG. 16). The load 126 explodes forcing the nail 14 out of the muzzle 106 and into the surface to be penetrated.

Figure 19:
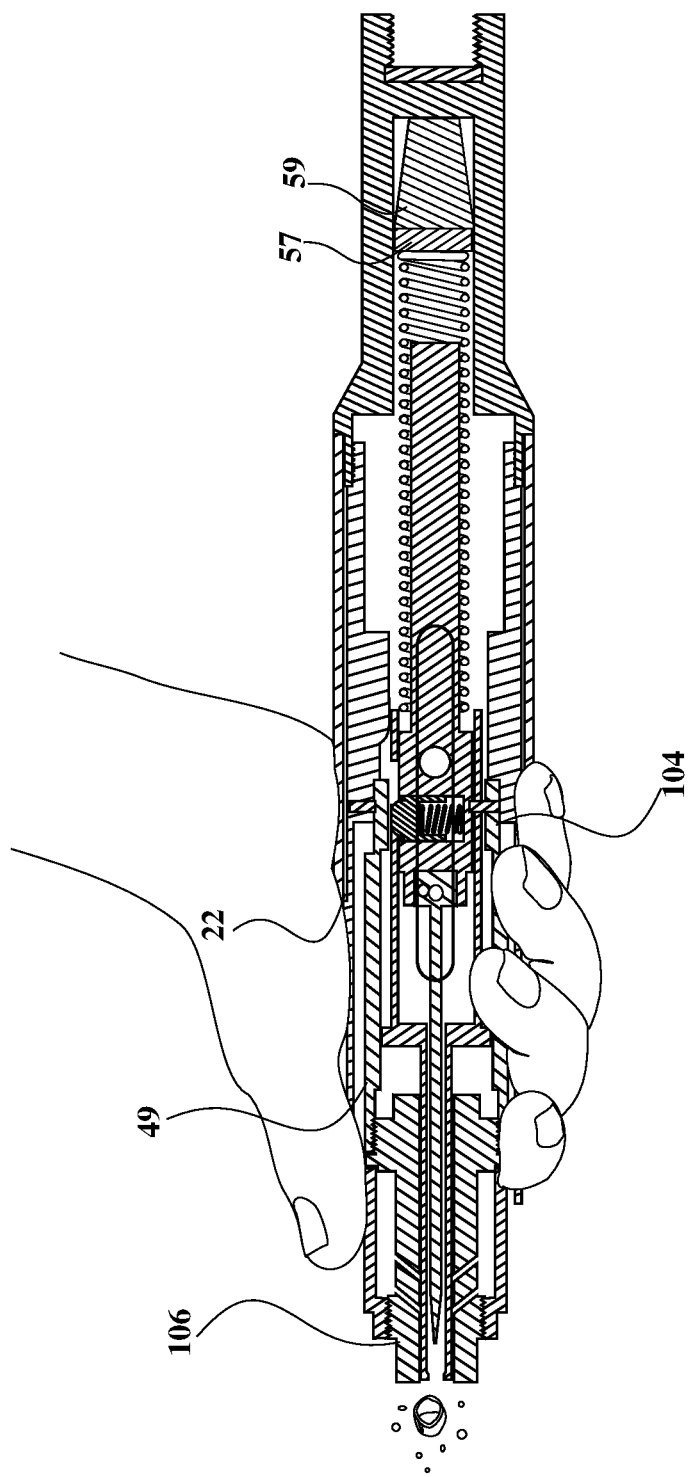
FIG. 19 is a longitudinal section and partial perspective view illustrating the tool ejecting a spent load container.
Figure 22:
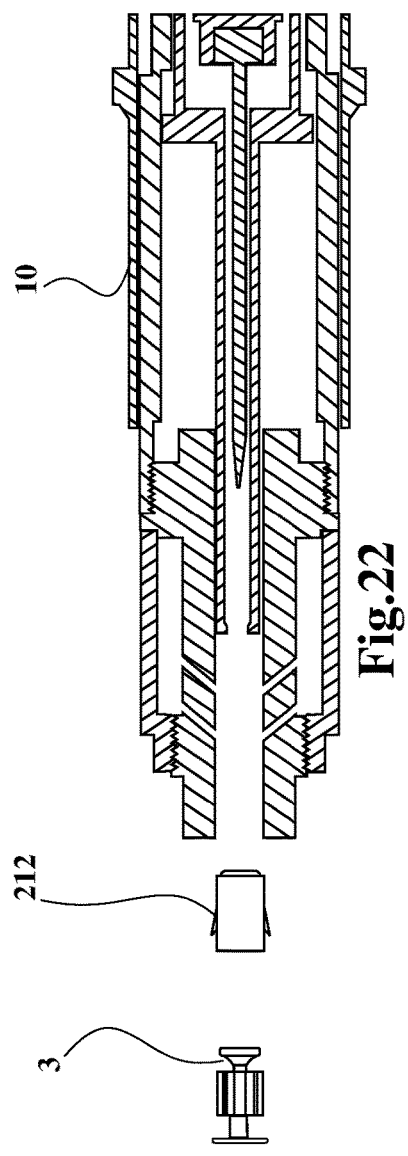
Figure 23:
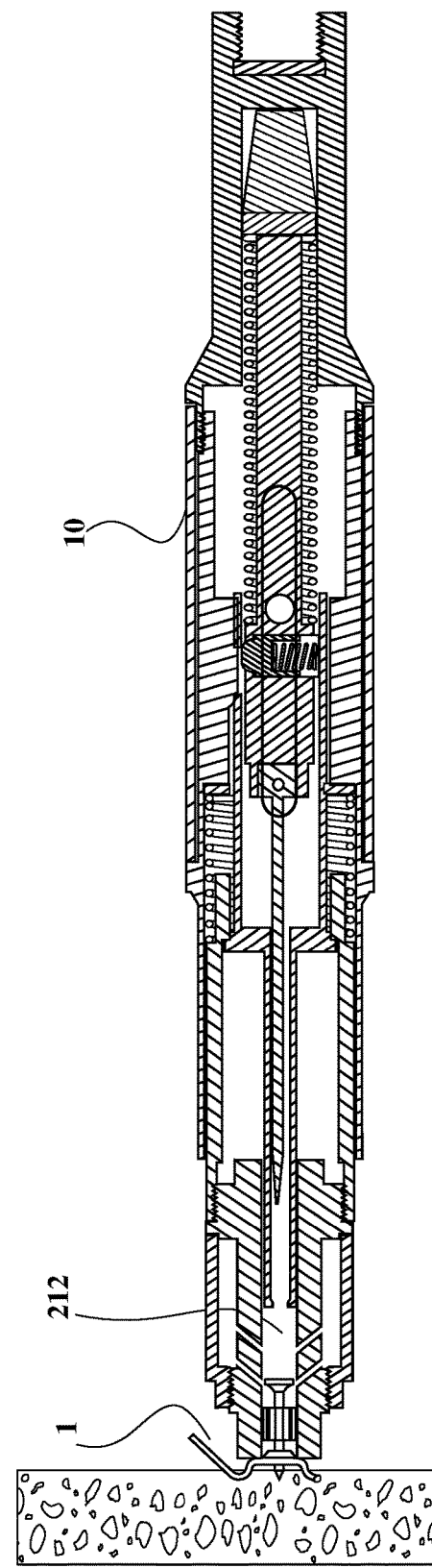

When the tool is moved away from the fastener, the springs 56 and 104 move the parts back to their original positions (FIG. 17) with the trigger 88 engaging the circular stop 90. In some cases, the plastic cap 18, or a portion of it will remain attached to the nail head as shown in FIG. 17. In some cases, the plastic cap or a portion of it will remain in the bore 107 of the muzzle 106 as shown in FIG. 18. These remnants of the fastener are easily ejected from the tool by moving the muzzle 106 and inner sleeve 94 proximally toward the main body 22 against the action of reset spring 104. This brings the end of the muzzle closer to the end of the firing pin assembly guide as shown in FIG. 19, thereby ejecting any remnants of the plastic cap.

The apparatus according to the invention obviates the need to purchase separate loads for the tool and there is no need to place fasteners and loads into the tool separately. The tool is easily assembled and disassembled for cleaning and is preferably made entirely of stainless steel. Since the nail is directly propelled by the explosive rather than by a driver propelled by explosive, better nail penetration is achieved. In addition, there is no need to replace drivers which wear after repeated impact against nail heads. Further, the absence of a driver results in the absence of vibration when the tool is in use. This results in greater accuracy and less noise. The nail penetrates much faster and thus results in a lower failure rate. The slim profile of the tool allows it to fit into tight spaces such as between ductwork, pipes, etc. The tool automatically triggers and is automatically reset after use. Interchangeable muzzles obviates the need for different loads. The force of a standard load can be regulated by the choice of muzzle.

The construction of the tool renders it lighter. The tool in combination with the provided fastener is quieter than powder actuated tools. This is important when working in an occupied building. The plastic cap on the nail contains the energy that would otherwise escape and cause noise.

The tool 10 according to the invention can be used with prior art fasteners as shown in FIGS. 20-25. Prior art fasteners 1, 2, and 3 can be used in the tool 10 with an explosive load 212. The load 212 is substantially the same as the load described above but not connected to a nail. The load 212 is loaded into the apparatus 10 first and then the fastened is inserted on to of it.

According to the presently preferred embodiment, the explosive load 212 (as well as the plastic cap 16) is made of an ABS plastic container having the following properties:

TABLE

| Property | Test Method | Units | Number |
|---|---|---|---|
| Tensile Strength | ASTM D-638 | kg/cm$^2$ | 350-500 |
| Flexural Strength | ASTM D-790 | kg/cm$^2$ | 550-650 |
| IZOD Impact Strength | ASTM D-256 | kg-cm/cm | 25-35 |

This construction of the container helps optimize the impact of the explosion while minimizing noise.

The contents of the plastic container (i.e. nitrocellulose load 126) preferably has the following formulation: 94% Nitrocellulose, 5% Methocel and color agent, 1% Diphenylamine.

There have been described and illustrated herein several embodiments of an apparatus for installing explosively driven fasteners and fasteners for use therewith. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A tool for installing an explosively driven fastener, the fastener including a nail and an explosive load attached to the nail, said tool comprising:
   a trigger body having a distal end, a proximal end, and a longitudinal axis;
   a firing pin holder located within said trigger body;
   a firing spring coupled to said firing pin holder and arranged to bias said firing pin holder toward the distal end of said trigger body;
   a firing pin coupled to said firing pin holder;
   a first muzzle having a proximal end and a distal end, said proximal end arranged to receive said firing pin and said distal end arranged to receive the fastener;
   a reset sleeve coaxially mounted within said trigger body;
   a reset spring biasing said reset sleeve away from said trigger body;
   a firing pin assembly guide extending into said trigger body,
   said reset sleeve and said first muzzle; said firing pin assembly guide having an outer flange;
   said reset sleeve having an inner flange engageable by said outer flange;
   said firing pin assembly guide has a proximal end portion which extends into said trigger body and said reset sleeve, and
   a distal end portion which extends into said first muzzle;
   wherein movement of said firing pin holder moves said firing pin relative to said trigger body, such that when the fastener is placed in the distal end of the first muzzle and the firing pin holder is biased toward the distal end of the trigger body by the firing spring, the firing pin strikes the explosive load causing the explosive load to explode and drive the nail out of the first muzzle;
   said tool further comprising: a trigger and a trigger spring mounted in said firing pin holder, said trigger being biased radially outward from within said firing pin holder; said firing pin assembly guide having a circular stop engageable by said trigger;
   wherein said firing pin assembly guide has a keyway intersecting said circular stop,
   and said trigger body has an internal key receivable by said keyway.

2. The tool according to claim 1, wherein: said distal end portion of the firing pin assembly guide has a plurality of circumferential grooves.

3. A The tool according to claim 1, further comprising: a second muzzle; said first muzzle having a first plurality of exhaust bores; said second muzzle having a second plurality of exhaust bores, said first plurality and said second plurality being different in number; said first and second muzzles being interchangeable in said tool such that use of said first muzzle results in the explosive load exerting a first force on the nail and use of said second muzzle results in the explosive load exerting a second force on the nail, the first and second forces being different in magnitude.

4. The tool according to claim 3 further comprising: a polytetrafluoroethylene ring mounted between said firing pin assembly guide and said reset sleeve.

5. The tool according to claim 1, wherein: when said tool is in a first resting position, said trigger is engaged in said circular stop thereby limiting distal movement of said firing pin, and when said tool is in a second firing position, said key enters said keyway, crosses said circular stop, depresses said trigger out of engagement with said circular stop and allows distal movement of said firing pin under the action of said firing spring.

6. The tool according to claim 5, wherein: when said tool is in a third reset position, said reset spring biases said reset sleeve away from said trigger body with said inner flange engaging said outer flange thereby biasing said trigger pin assembly guide out of engagement with said key until said trigger again engages said circular stop, thereby automatically resetting said tool.

7. The tool according to claim 1, further comprising: a debris cup removably covering said first muzzle.

8. The tool according to claim 1 further comprising: a frustroconical rubber buffer mounted between said trigger body and said firing spring.

9. The tool according to claim 8, further comprising: a metal disk mounted between said rubber buffer and said firing spring.

10. A kit, comprising:
an explosively driven fastener, said explosively driven fastener comprising:
    a nail having a point and a head;
    a plastic cap having a proximal end and a distal end, said distal end coupled to said head;
    an explosive load mounted in said proximal end of said plastic cap;
    said plastic cap defining a buffer between said explosive load and said head;
a tool for installing the explosively driven fastener, said tool comprising:
    a trigger body having a distal end, a proximal end, and a longitudinal axis;
    a firing pin holder located within said trigger body;
    a firing spring coupled to said firing pin holder and arranged to bias said firing pin holder toward the distal end of said trigger body;
    a firing pin coupled to said firing pin holder;
    a reset sleeve coaxially mounted within said trigger body;
    a reset spring biasing said reset sleeve away from said trigger body;
    a firing pin assembly guide extending into said trigger body, said reset sleeve and a first muzzle;
    said firing pin assembly guide having an outer flange;
    said first muzzle having a proximal end and a distal end, said proximal end arranged to receive said firing pin and said distal end arranged to receive the fastener;
    said reset sleeve having an inner flange engageable by said outer flange;
    said firing pin assembly guide has a proximal end portion which extends into said trigger body and said reset sleeve, and a distal end portion which extends into said first muzzle;
    wherein movement of said firing pin holder moves said firing pin relative to said trigger body, such that when the fastener is placed in the distal end of the first muzzle and the firing pin holder is biased toward the distal end of the trigger body by the firing spring, the firing pin strikes the explosive load causing the explosive load to explode and drive the nail out of the first muzzle;
said tool further comprising:
    a trigger and a trigger spring mounted in said firing pin holder, said trigger being biased radially outward from within said firing pin holder;
    said firing pin assembly guide having a circular stop engageable by said trigger;
    wherein said firing pin assembly guide has a keyway intersecting said circular stop, and said trigger body has an internal key receivable by said keyway.

11. The kit according to claim 10, further comprising: a second muzzle; said first muzzle having a first plurality of exhaust bores; said second muzzle having a second plurality of exhaust bores, said first plurality and said second plurality being different in number; said first and second muzzles being interchangeable in said tool such that use of said first muzzle results in the explosive load exerting a first force on the nail and use of said second muzzle results in the explosive load exerting a second force on the nail, the first and second forces being different in magnitude.

12. The kit according to claim 10, wherein: said distal end portion of the firing pin assembly guide has a plurality of circumferential grooves.

13. The kit according to claim 10, wherein: said plastic cap defines a buffer between said explosive load and said head.

14. The kit according to claim 10, said tool further comprising: a frustroconical rubber buffer mounted between said trigger body and said firing spring.

15. The kit according to claim 14, said tool further comprising: a metal disk mounted between said rubber buffer and said firing spring.

16. The kit according to claim 10, said tool further comprising: a polytetrafluoroethylene ring mounted between said firing pin assembly guide and said reset sleeve.

* * * * *